Dec. 16, 1969       J. M. WALTER          3,484,065
                MECHANICAL COLUMN TILTING DEVICE
Filed July 31, 1967                    2 Sheets-Sheet 2
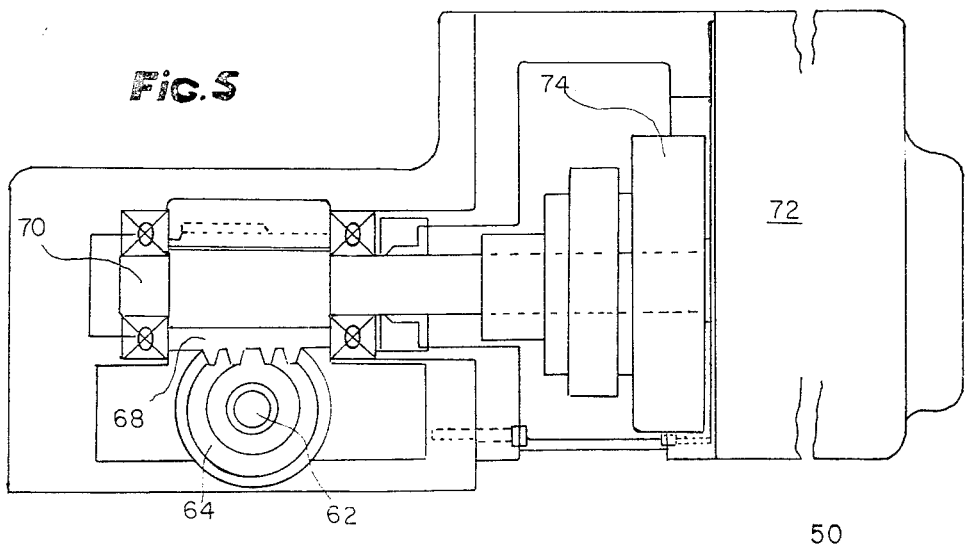
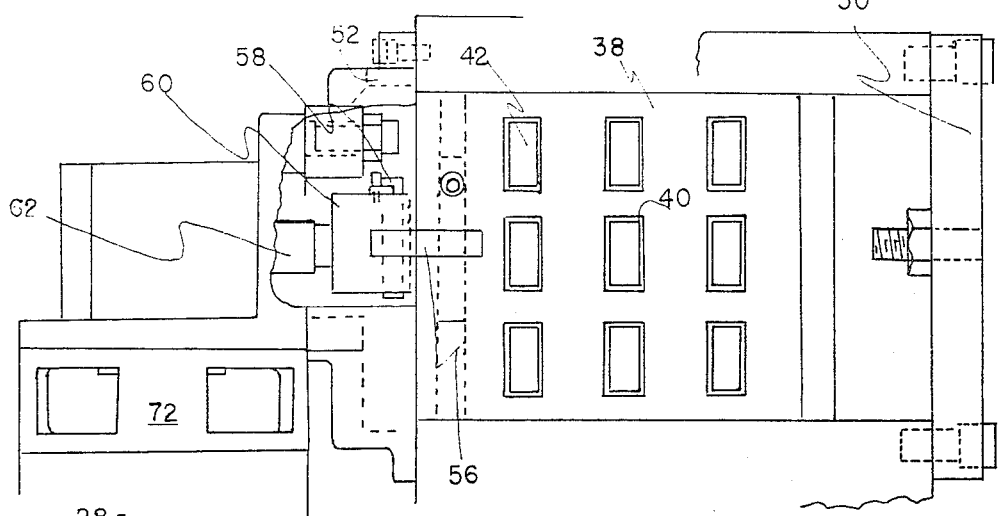
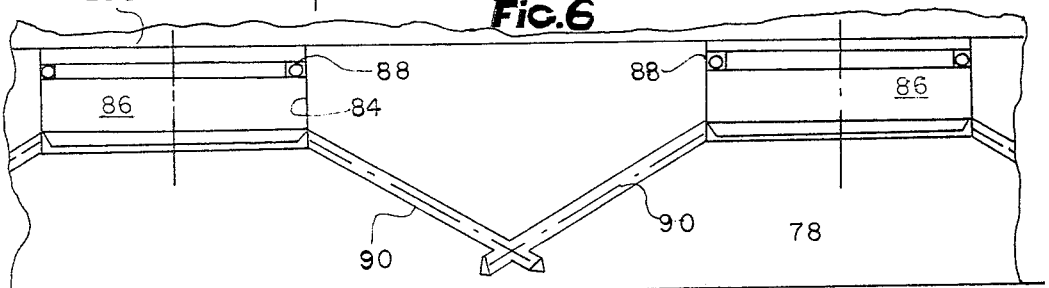
INVENTOR
JOHN M. WALTER, DECEASED,
By Dolores G. Walter, Executrix
BY *Melville, Strasser, Foster and Hoffman*
ATTORNEYS

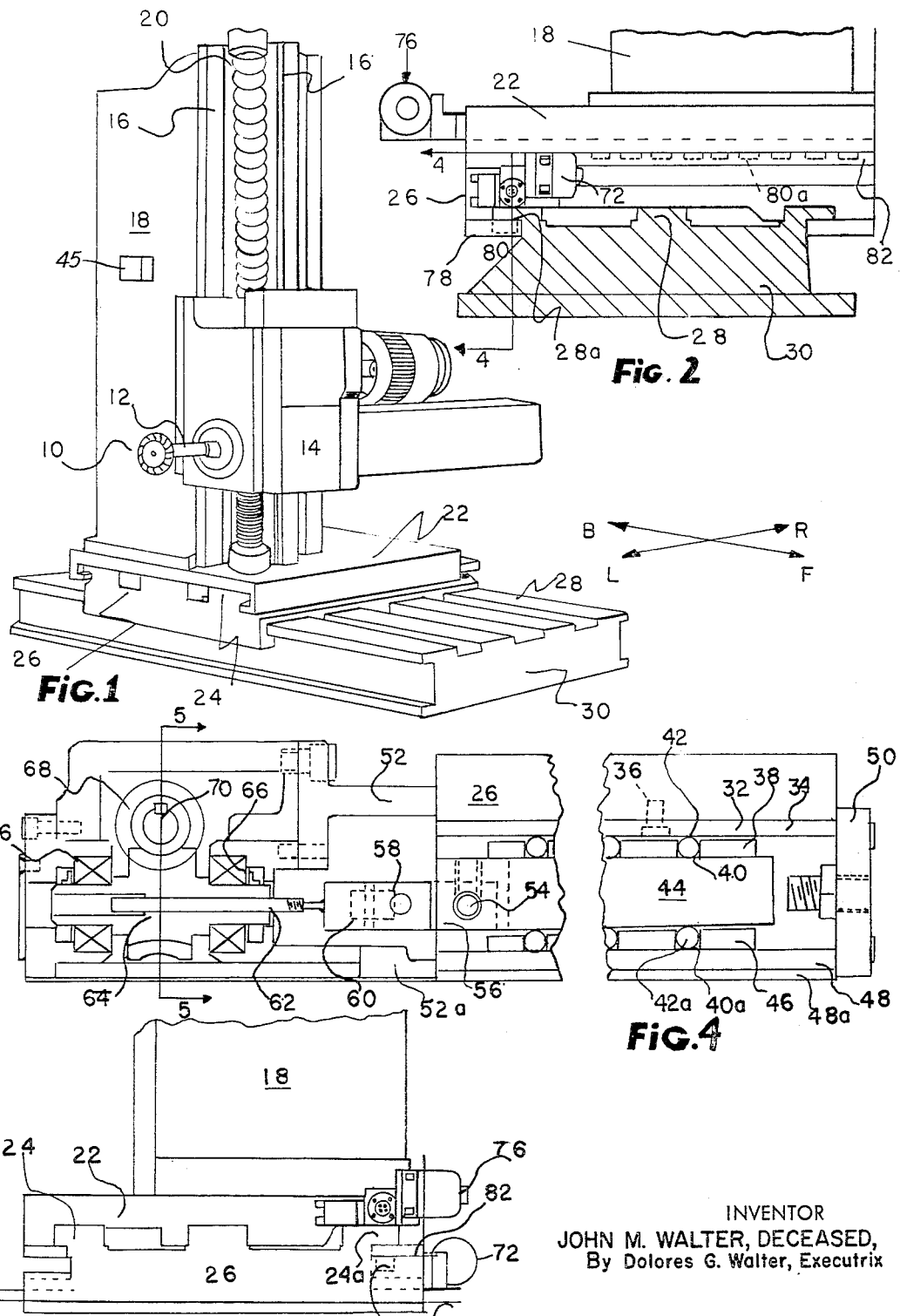

United States Patent Office 3,484,065
Patented Dec. 16, 1969

3,484,065
MECHANICAL COLUMN TILTING DEVICE
John M. Walter, deceased, late of Cincinnati, Ohio, by Dolores G. Walter, executrix, Cincinnati, Ohio, assignor to The G. A. Gray Company, Cincinnati, Ohio, a corporation of Ohio
Filed July 31, 1967, Ser. No. 657,430
Int. Cl. F16m 11/00
U.S. Cl. 248—13           4 Claims

ABSTRACT OF THE DISCLOSURE

A machine tool has a vertical tool carrying column with a base which is slidable carried on a saddle which is also slidable carried by bearings on ways on the machine tool support. The bearings on one side of the saddle are vertically adjustable in response to a sensor, carried on the column, which senses minor deviations of the column from the vertical in order to return the column to true vertical. A second sensor and bearing adjusting arrangement may be provided between the column base and saddle perpendicular to the first to maintain the position of the column in two directions. A positive clamp may also be included to lock the column in adjusted position.

BACKGROUND OF THE INVENTION

This invention relates to machine tools which include a large vertical column which is movable during operation, and which carries the driving head and cutting tool. It has long been recognized that very minor vertical misalignment of the column will result in a much greater error in cutting tool location. These errors can in part be controlled by proper design rigidity of the various components of the tool which minimizes these deflection errors.

Since minor errors in vertical alignment can be caused by such things as temperature gradients in various portions of the machine due to for example, sunlight, local drafts, or the like, it is impossible to design sufficient rigidity into the machine that some small deflection or misalignment does not occur. In addition, it will be apparent that the differential expansion of the temperature gradients as outlined above is not predictable. It is therefore imperative to provide means for compensating for these errors during machine operation.

SUMMARY

This invention contemplates the provision of a power operated wedge associated with the vertical column of a machine tool, and operative in response to errors in vertical alignment to mechanically tilt the column to restore the proper alignment.

According to this invention, a wedge block, preferably equipped with anti-friction bearings is utilized to mechanically tilt the column. The wedge block itself can be moved by any suitable drive means which is properly controlled by a level sensing device disposed on the machine tool column. That is, an electronic level sensor attached to the column will detect alignment errors, and energize the necessary power source to move the wedge block, thereby tilting the column, and restoring vertical alignment.

DESCRIPTION OF THE DRAWING

FIGURE 1 is a perspective view showing a horizontal boring, drilling and milling machine to which this invention can advantageously be applied.

FIGURE 2 is a cross sectional view through the runway to the rear of the column of FIGURE 1.

FIGURE 3 is a partial elevational view from the left hand side of FIGURE 2.

FIGURE 4 is a cross sectional view along the line 4—4 of FIGURE 2 showing the means for moving the wedge block of this invention.

FIGURE 5 is a cross sectional view along the line 5—5 of FIGURE 4.

FIGURE 6 is a top plan view with parts broken away of the mechanism shown in FIGURES 4 and 5.

FIGURE 7 is a cross sectional view on a greatly enlarged scale showing a plurality of clamping pistons schematically seen in FIGURE 2.

DESCRIPTION OF THE PREFERRED EMBODIMENT

FIGURE 1 is a perspective view of a large horizontal boring, drilling, and milling machine, to which this invention can advantageously be applied. A cutting tool 10 will be mounted on the end of a cylindrical spindle 12 which is carried by the driving head 14. The head 14 is mounted on vertical ways 16 on the large column 18, and is moved up and down these ways by the vertical screw 20. The column 18 is mounted on the column base 22, which may be moved in a direction parallel to the spindle axis on ways 24. The saddle 26 may be moved in a direction perpendicular to the spindle axis along the ways 28 on a runway 30. This runway supports the whole machine and rests on a reinforced concrete foundation.

The column 18 on a typical machine may be 20 feet high, and will weigh many tons. It will be recognized that it is impossible to design a support for a column of this magnitude with sufficient rigidity to prevent small deflections from true vertical alignment. As already indicated, it is an object of this invention to provide a mechanical column tilting arrangement which will automatically tilt the column 18 very slightly to compensate for vertical misalignment during operation.

Referring now to FIGURE 4, one of the power operated wedges of this invention will be described in detail. For purposes of orientation, FIGURE 4 is a cross sectional view perpendicular to the ways 24, and through one of the ways 28. It will be seen that the underside of the saddle 26 is provided with a recess 32 accommodating the power operated wedge of this invention. Within this recess, and securely bolted to the saddle itself is the hardened plate 34. It will of course be understood that the bolts 36 will be located between the rollers described hereinafter.

Adjacent the plate 34 is the upper roller retainer 38, which as seen in FIGURE 6 is provided with a plurality of openings 40 which accommodate the rollers 42.

The wedge block itself is indicated at 44. The width of the wedge block will be substantially equal to the width of the recess 32, and the length of the wedge block will be somewhat less than the length of the recess, as clearly seen in FIGURES 4 and 6. The degree of taper of the wedge block is not absolutely critical, but it is contemplated that a taper on the order of ¼ inch per foot is preferable.

Beneath the wedge block 44 is the lower roller retainer 46 which is identical to the retainer 38, and includes a plurality of openings 40a accommodating the rollers 42a.

Beneath the lower roller retainer is the hardened plate 48. As will be apparent from considering FIGURE 4, this plate is restrained against movement longitudinally of the recess by means of the bar 50 at one end, and by means of the lower portion 52a of the casting 52 at the other end, both of which are securely bolted or otherwise secured to the saddle itself. While the bar 50 and portion 52a of the casting restrain the plate 48 against movement longitudinally of the recess, they will permit the plate 48 to move up and down with respect to the top of the saddle.

According to the preferred embodiment of the invention, a thin sheet of non-metallic bearing material 48a will be glued to the lower surface of the plate 48, to provide a good bearing surface, slidable against the way 28 of the runway 30.

In order to move the wedge block 44 longitudinally within the recess, it will be observed that one end of the block is provided with the wedge pin 54. This pin 54 engages one end of the link 56. The other end of the link 56 is secured by the yoke pin 58 to the yoke 60 on the end of the nonrotatable screw 62.

The screw portion 62 is threadedly engaged in the center of the worm wheel 64 which will be carried by suitable bearings 66, and driven by the worm 68 mounted on the shaft 70 of motor 72. In the embodiment shown, a slip clutch 74 is utilized in the motor drive in order to permit the use of mechanical stops for the wedge block travel.

It is believed that operation of the power operated wedge just described should be clear. By way of review, one edge of the saddle 26 is provided with a recess overlying one of the ways 28. This recess carries a bearing plate 48, 48a, which is slidable along the way 28, and is spaced from the bottom of the recess by means of the power operated wedge of this invention. The power operated wedge includes the wedge block 44 having anti-friction bearings adjacent each surface. By pushing or pulling the wedge block 44, the vertical distance between the top of the saddle and the bottom of the bearing surface 48a can be varied a slight amount. This variation in vertical distance will serve to tilt the column in a plane parallel to the axis of spindle 12.

As indicated earlier in this specification, movement of the wedge block 44 will be controlled by a level sensing device mounted on the column 18 as schematically shown at 45 in FIGURE 1. The level sensing device, per se is well known in the art.

It will of course be apparent that in order to maintain true vertical alignment of the column 18, it will be necessary to provide a tilting mechanism in two perpendicularly arranged planes. Accordingly, a power operated wedge substantially identical to the one just described must also be provided in a recess in the undersurface of the column base and over one of the ways 24. As already indicated, this second wedge is identical in all respects to the wedge described above, and hence will not be described in detail in this specification. In FIGURES 2 and 3, the motor and drive arrangement for this second wedge is indicated generally at 76.

In certain types of operations, it may be desirable to provide a positive clamping force between for example the saddle and runway, or between the column base and saddle. According to this invention, this clamping force will be exerted between the retainer plate 78 secured to the saddle, and the underside or lip of the way 28a on the runway by means of the pistons seen schematically at 80. Similarly, the clamping force can be exerted between the retainer plate 82 secured to the column base and the underside of the lip or way 24a of the saddle by the pistons 80a. Because some vertical movement must be allowed to permit the tilt correction of the power wedge, a .010 inch clearance will normally be provided between the upper surface of the retainer plates 78 and 82, and the lower surface of the ways 24a and 28a.

The clamping pistons are shown in more detail in FIGURE 7. It will be observed that the retainer plates 78 and 82 are each provided with a plurality of recesses 84 which receive the pistons 86. Each piston is provided with the O-ring 88 to accomplish a seal. A plurality of ducts 90 provide communication from a source of hydraulic fluid (not shown) to each of the recesses 84.

The skilled worker in the art will appreciate that numerous modifications can be made in the foregoing description without departing from the scope and spirit of this invention. For example, on smaller machines plain bearings could be used in place of the roller bearings shown on either side of the wedge block 44. Or, if desired, hydrostatic pockets could be utilized in place of the roller bearings.

Furthermore, the drawings show a screw and worm gear drive for moving the wedge block in and out. This could of course be accomplished by a hydraulic piston and cylinder if desired.

The embodiments of the invention in which an exclusive property or privilege is claimed are defined as follows:

1. A machine tool comprising:
 (a) a supporting component;
 (b) a supported component movable with respect to said supporting component;
 (c) a plurality of sliding bearings between said supporting and supported components, at least one of said sliding bearings being vertically adjustable, said one of said sliding bearings including:
  (i) a bearing surface carried by said supported component, said bearing surface being longitudinally restrained with respect to said supported component but being vertically movable with respect thereto;
  (ii) a wedge block disposed between said bearing surface and said supported component; and
  (iii) means to move said wedge block whereby to vary the vertical distance between said bearing surface and said supported component to tilt said supported component,
 (d) level sensing means associated with said supported component; and
 (e) means operatively connecting said level sensing means and said means to move said wedge block, whereby to tilt said supported component into true alignment in response to level error detected by said level sensing means.

2. The tilt correcting means claimed in claim 1 including anti-friction bearing means adjacent each surface of said wedge block.

3. The tilt correcting means claimed in claim 1 including means to releasably clamp said supported surface and said supporting surface together.

4. The tilt correcting means claimed in claim 1 wherein the taper of said wedge block is on the order of ¼ inch per foot.

References Cited
UNITED STATES PATENTS

| | | | |
|---|---|---|---|
| 1,417,639 | 5/1922 | Sterner | 248—188.4 |
| 2,648,999 | 8/1953 | Stephan | 248—23 X |
| 2,947,224 | 8/1960 | Woytych | 308—3 X |
| 3,008,381 | 11/1961 | Jones | 90—15 |
| 3,097,568 | 7/1963 | Kampmeier | 248—125 X |
| 3,153,789 | 10/1964 | Ashton | 52—1 X |
| 3,198,588 | 8/1965 | Cashman et al. | 308—6 |
| 3,206,151 | 8/1965 | Lillestrand | 248—188.4 |

ROY D. FRAZIER, Primary Examiner

U.S. Cl. X.R.

90—15; 248—180, 188.3, 371; 308—3